United States Patent [19]
Sakamoto

[11] Patent Number: 5,167,592
[45] Date of Patent: Dec. 1, 1992

[54] AUTOMATIC TRANSMISSION
[75] Inventor: Kenichi Sakamoto, Shizuoka, Japan
[73] Assignee: Jatco Corporation, Japan
[21] Appl. No.: 698,128
[22] Filed: May 10, 1991
[51] Int. Cl.$^5$ .............................................. F16H 3/62
[52] U.S. Cl. .................... 475/277; 475/275; 475/288
[58] Field of Search ............... 475/275, 277, 278, 284, 475/285, 288, 289, 311, 313, 330

[56] References Cited
U.S. PATENT DOCUMENTS
3,915,033 10/1975 Polak ............................ 475/286 X
4,774,856 10/1988 Hiraiwa ........................ 475/284 X
5,013,289 5/1991 Van Maanen .................. 475/330 X

FOREIGN PATENT DOCUMENTS
55-63041 5/1980 Japan ................................. 475/285
62-80329 4/1987 Japan ................................. 475/284
62-141344 6/1987 Japan .

Primary Examiner—Rodney H. Bonck
Assistant Examiner—Ryan W. Massey
Attorney, Agent, or Firm—Ronald P. Kananen

[57] ABSTRACT

An automatic transmission for use with an automotive vehicle having an engine provided with an output shaft, and a differential. The automatic transmission comprises a casing, and first, second and third shafts arranged in the casing. The first shaft is concentrical with the engine output shaft. The second shaft is parallel with the first shaft. The third shaft is concentrical with the second shaft. The third shaft is connected to the differential. A first transfer gear train is provided for transmitting rotation from the first shaft to the second shaft. The automatic transmission also comprises a main transmission unit including planetary gearing having rotary members for providing a plurality of torque delivery paths between the second and third shafts, and friction elements associated with the planetary gearing for selecting one of the torque delivery paths in response to a selected gear position. The planetary gearing is provided on the second shaft. An equivalent rotary member is provided on the first shaft. The equivalent rotary member is equivalent to one of the rotary members. The friction elements includes a first friction element through which the equivalent rotary member is connected to the first shaft and a second friction element through which the equivalent rotary member is connected to the casing. A second transfer gear train is provided for transmitting rotation from the one rotary member to the equivalent rotary member.

10 Claims, 6 Drawing Sheets

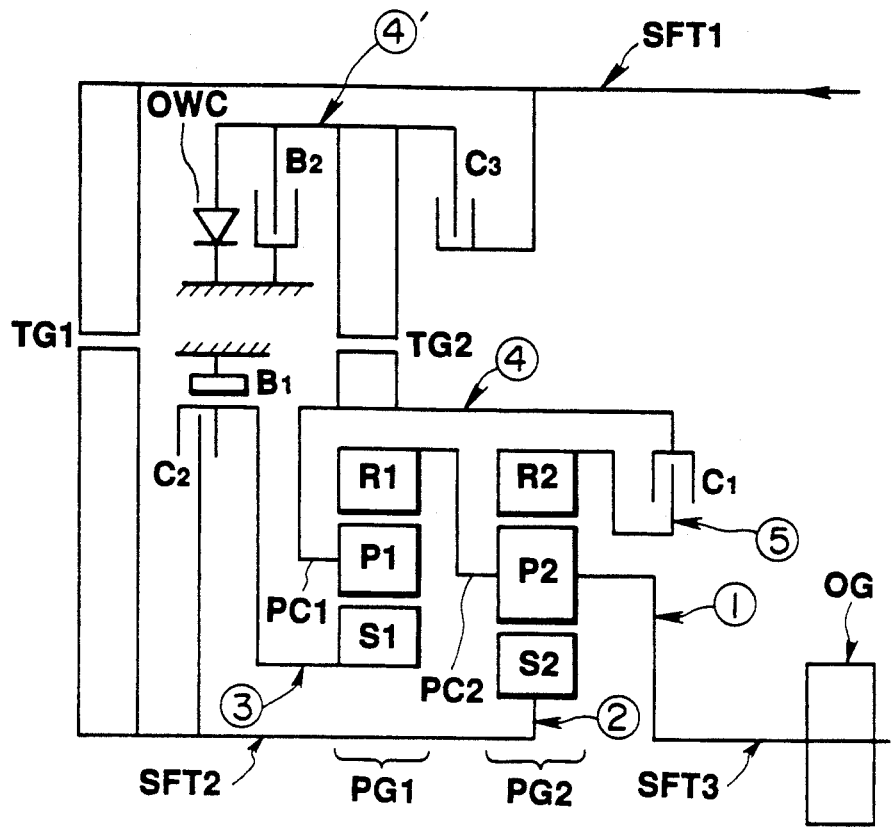

| | $C_1$ | $C_2$ | $C_3$ | $B_1$ | $B_2$ | OWC |
|---|---|---|---|---|---|---|
| P | × | × | × | × | × | — |
| R | × | ○ | × | × | ○ | — |
| N | × | × | × | × | × | — |
| $D_1$ | ○ | × | × | × | (○) | ○ |
| $D_2$ | ○ | × | × | ○ | × | — |
| $D_3$ | ○ | × | ○ | × | × | — |
| $D_4$ | × | × | ○ | ○ | × | — |

○ = ENGAGED   × = DISENGAGED

|   | C1 | C2 | C3 | C4 | B1 | B2 | OWC |
|---|----|----|----|----|----|----|-----|
| P | △ | × | × | × | × | × | — |
| R | × | ○ | ○ | × | × | ○ | — |
| N | △ | × | × | × | × | × | — |
| D1 | ○ | × | × | ○ | × | (○) | ○ |
| D2 | ○ | × | ○ | × | × | (○) | ○ |
| D3 | ○ | × | ○ | × | ○ | × | — |
| D4 | ○ | × | ○ | ○ | × | × | — |
| D5 | × | × | ○ | ○ | ○ | × | — |

○ = ENGAGED     × = DISENGAGED

△ = ENGAGED OR DISENGAGED

|   | C1 | C2 | C3 | C4 | B1 | B2 | OWC |
|---|----|----|----|----|----|----|-----|
| P | △ | × | × | × | × | × | — |
| R | × | ○ | ○ | × | × | ○ | — |
| N | △ | × | × | × | × | × | — |
| D1 | ○ | × | × | ○ | × | (○) | ○ |
| D2 | ○ | × | ○ | × | × | (○) | ○ |
| D3 | ○ | × | ○ | × | ○ | × | — |
| D4 | ○ | × | ○ | ○ | × | × | — |
| D5 | × | × | ○ | ○ | ○ | × | — |

○ = ENGAGED   × = DISENGAGED
△ = ENGAGED OR DISENGAGED

AUTOMATIC TRANSMISSION

BACKGROUND OF THE INVENTION

This invention relates to an automatic transmission for use with automotive vehicles of the FF (front-engine front-drive) or RR (rear-engine rear-drive) type.

For example, Japanese Patent Kokai No. 62-141344 discloses a conventional automatic transmission for use with automotive vehicles. The automatic transmission includes three shafts. The first shaft is concentrical with the engine output shaft. The second shaft is a hollow shaft surrounding the first shaft. The third shaft is parallel with the first and second shafts and it has a differential provided thereon. The automatic transmission also includes a main transmission unit provided on the second shaft and an auxiliary transmission unit provided on the third shaft. With such a conventional arrangement, however, it is necessary to place all of the components of the main transmission unit on the second shaft. For this reason, it has a limited degree of freedom of automatic transmission design and results in a space consuming automatic transmission.

SUMMARY OF THE INVENTION

Therefore, it is a main object of the invention to increase the degree of freedom in designing automatic transmissions.

It is another object of the invention to provide a compact automatic transmission.

There is provided, in accordance with the invention, an automatic transmission for use with an automotive vehicle having an engine provided with an output shaft, and a differential. The automatic transmission comprises a casing, and first, second and third shafts arranged in the casing. The first shaft is concentrical with the engine output shaft. The second shaft is parallel with the first shaft. The third shaft is concentrical with the second shaft. The third shaft is connected to the differential. A first transfer gear train is provided for transmitting rotation from the first shaft to the second shaft. The automatic transmission also comprises a main transmission unit including planetary gearing having rotary members for providing a plurality of torque delivery paths between the second and third shafts, and friction elements associated with the planetary gearing for selecting one of the torque delivery paths in response to a selected gear position. The planetary gearing is provided on the second shaft. An equivalent rotary member is provided on the first shaft. The equivalent rotary member is equivalent to one of the rotary members. The friction elements include a first friction element through which the equivalent rotary member is connected to the first shaft and a second friction element through which the equivalent rotary member is connected to the casing. A second transfer gear train is provided for transmitting rotation from the one rotary member to the equivalent rotary member.

BRIEF DESCRIPTION OF THE DRAWINGS

This invention will be described in greater detail by reference to the following description taken in connection with the accompanying drawings, in which:

FIG. 1 is a schematic diagram showing a first embodiment of an automatic transmission made in accordance with the invention;

FIG. 2 is a table showing the engaged and disengaged states of friction clutches and brakes illustrated in FIG. 1 to effect various speed ratio changes;

DETAILED DESCRIPTION OF THE INVENTION

Figure 3:
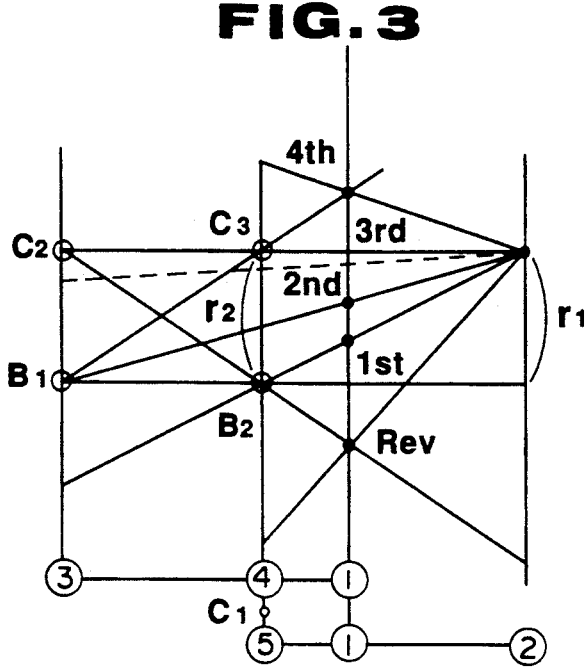
FIG. 3 is a diagram used in explaining the operation of the automatic transmission of FIG. 1.

With reference to the drawings, and in particular to FIG. 1, there is shown a schematic diagram of an automatic transmission embodying the invention. The automatic transmission includes first, second and third shafts SFT1, SFT2 and SFT3 arranged in a transmission casing. The first shaft (input member) SFT1 is concentrical with an engine output shaft and is connected to the engine output shaft. The second shaft SFT2 is not concentrical and parallel with the first shaft SFT1. The third shaft (output member) SFT3 is concentrical with the second shaft SFT2. The third shaft SFT3 has an output gear OG for connection to a differential (not shown). A first transfer gear train TG1 is provided for transmitting rotation from the first shaft SFT1 to the second shaft SFT2. The second shaft SFT2 has a main transmission provided thereon. The main tranmission includes a gear train comprised of first and second simple planetary gear units PG1 and PG2 for providing a plurality of torque delivery paths between the second and third shafts. The first planetary gear unit PG1 includes a first ring gear R1, a first sun gear S1, a first pinion P1 and a first pinion carrier PC1 which carries the first pinion P1. The second planetary gear unit PG2 includes a second ring gear R2, a second sun gear S2, a second pinion P2, and a second pinion carrier PC2 which carries the second pinion P2. The second pinion carrier PC2 is connected to the first ring gear R1.

The automatic transmission also includes five rotary members 1, 2, 3, 4 and 5. The first rotary member 1 is connected to the second pinion P2 and also to the third shaft SFT3. The second rotary member 2 is connected to the second sun gear S2. The second rotary member 2 is connected to the second sun gear S2 and also to the second shaft SFT2. The third rotary member 3 is connected to the first sun gear S1. The third rotary member 3 is connected through a second clutch C2 to the second shaft SFT2 and also through a first brake B1 to the transmission casing. The fourth rotary member 4 is connected to the first pinion carrier PC1. The fifth rotary member 5 is connected to the second ring gear R2 and also through a first clutch C1 to the fourth rotary member 4.

Rotation of the fourth rotary member 4 is transmitted through a second transfer gear train TG2 to an equivalent rotary member 4' provided for rotation about the first shaft SFT1. The equivalent rotation member 4' is connected through a third clutch C3 to the first shaft SFT1 and also through a second brake B2 or a one-way clutch OWC to the transmission casing. The one-way clutch OWC is operated mechanically. An automatic transmission control unit is employed to engage or disengage the hydraulic friction elements C1, C2, C3, B1 and B2 for selecting one of the torque delivery paths in response to a selected gear position.

FIG. 2 is a table showing the engaged and disengaged states of the hydraulic clutches and brakes for selected gear positions including a park position P, a reverse position R, a neutral position N and drive positions D1 to D4. As can be seen from FIG. 2, the automatic transmission produces four forward speed ratios and a reverse speed ratio.

The operation is as follows. The automatic transmission control unit engages two of the hydraulic friction elements C1, C2, C3, B1 and B2 to provide a speed ratio in the automatic transmission, as shown in FIG. 3. In FIG. 3, the abscissae represent the rotary member position assigned according to the selected gear tooth number ratio and the ordinates represent the rotation speed ratio. The friction elements are placed at respective points of intersection of the vertical and horizontal lines. The vertical lines extend through the respective rotary members. The horizontal lines include a line extending through a point at which the rotation speed ratio is zero and a line extending through a point at which the rotation speed ratio is 1. A point of intersection of the line extending through the two engaged friction elements and the line extending through the first rotary element (output member) 1 indicates a gear ratio; that is, the ratio of the rotation speed of the output member to the rotation speed of the input member.

Description will be made to the gear ratios at the respective gear positions. It is now assumed that $\alpha1$ is the ratio of the number of teeth in the first sun gear S1 to the number of teeth in the first ring gear R1, $\alpha2$ is the ratio of the number of teeth in the second sun gear S2 to the number of teeth in the second ring gear R2, $\beta1$ is the ratio of the number of teeth of the first transfer gear train TG1, and $\beta2$ is the ratio of the number of teeth of the second transfer gear train TG2. The gear ratios i1, i2, i3, i4 and iR for the respective gear positions D1, D2, D3, D4 and R are given as $$i1 = \frac{(1 + \alpha2) \cdot \beta1}{\alpha2}$$

$$i2 = \frac{(1 + \alpha1 + \alpha1/\alpha2) \cdot \beta1}{1 + \alpha1}$$

$$i3 = \left(1 + \frac{\beta2 - \beta1}{\beta2 \cdot \alpha2 + \beta1}\right) \cdot \beta1$$

-continued $$i4 = \frac{\beta2}{1 + \alpha1}$$

$$iR = \frac{\beta1}{\alpha1}$$

The conventional automatic transmission in which all of the components are placed on shafts concentical with each other has gear ratios which are obtained from the above equations when $\beta1=1$ and $\beta2=1$.

Substituting $\beta2/\beta1=k$ ($\beta2=k\cdot\beta1$) into the above equations gives $$i1 = \beta1 \cdot \frac{(1 + \alpha2)}{\alpha2}$$

$$i2 = \beta1 \cdot \frac{1 + \alpha1 + \alpha1/\alpha2}{1 + \alpha1}$$

$$i3 = \beta1 \cdot \left(1 + \frac{k - 1}{k \cdot \alpha2 + 1}\right)$$

$$i4 = \beta1 \cdot \frac{k}{1 + \alpha1}$$

$$iR = \beta1 \cdot \frac{1}{\alpha1}$$

Figure 4:
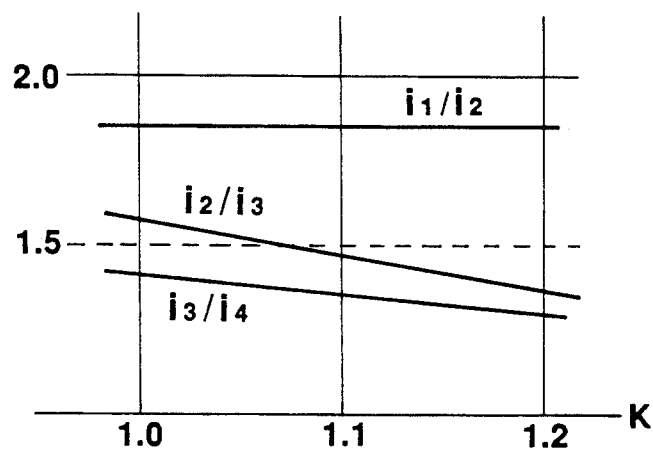
FIG. 4 is a graph used in explaining obtainable gear ratio variations with variations in the gear ratio of the transfer gear trains.

As can be seen from the above equations, it is possible to change the gear ratios i3 and i4 by changing the gear ratio $\beta2$ without any modification in the planetary gear units PG1 and PG2. This is effective to provide a gear ratio which cannot be obtained merely by modifying the planetary gear units PG1 and PG2. FIG. 4 shows changes in the ratios i2/i3 and i3/i4 with changes in the ratio k. When the ratio k is 1.0, the ratios i2/i3 and i3/i4 have values determined only by the planetary gear units PG1 and PG2. It is to be noted that the ratio i1/i2 is constant regardless of the ratio k.

Figures 5, 6:
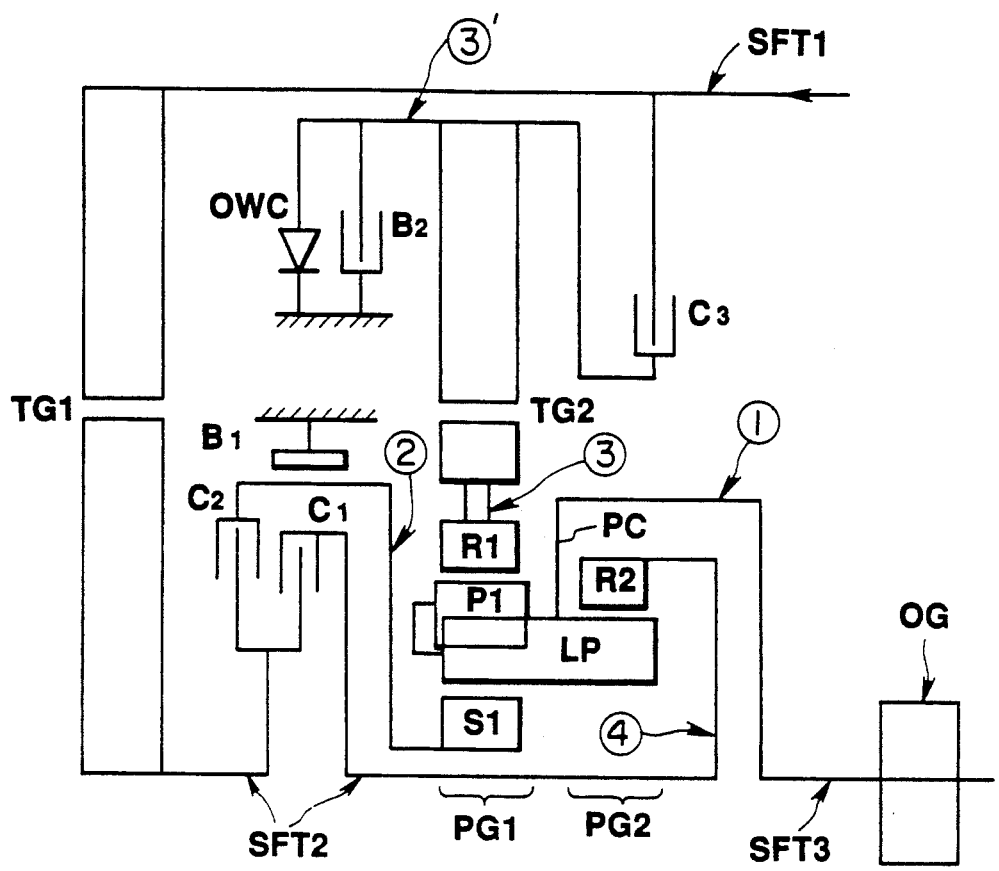
FIG. 5 is a schematic diagram showing a second embodiment of the automatic transmission of the invention.
FIG. 6 is a table showing the engaged and disengaged states of friction clutches and brakes illustrated in FIG. 5 to effect various speed ratio changes.

Referring to FIG. 5, there is shown a second embodiment of the automatic transmission of the invention. The automatic transmission includes first, second and third shafts SFT1, SFT2 and SFT3 arranged in a transmission casing. The first shaft (input member) SFT1 is concentrical with an engine output shaft and is connected to the engine output shaft. The second shaft SFT2 is not concentrical and parallel with the first shaft SFT1. The third shaft (output member) SFT3 is concentrical with the second shaft SFT2. The third shaft SFT3 has an output gear OG for connection to a differential (not shown). A first transfer gear train TG1 is provided for transmitting rotation from the first shaft SFT1 to the second shaft SFT2. The second shaft SFT2 is divided into first and second shaft sections concentrical with the third shaft SFT3. The first shaft section is connected through the first transfer gear train TG1 to the first shaft. The second shaft section is connected to the third shaft SFT3 through a main transmission provided on the second shaft SFT2. The main transmission includes a gear train comprised of a common carrier PC and first and second planetary gear units PG1 and PG2 for providing a plurality of torque delivery paths between the second and third shafts. The first planetary gear unit PG1 includes a first ring gear R1, a first sun gear S1 and a first pinion P1. The second planetary gear unit PG2 includes a second ring gear R2 and a long pinion LP held in mesh engagement with the second ring gear R2, the first sun gear S1 and the first pinion P1. The common carrier PC carries the first pinion P1 and the long pinion LP.

The automatic transmission also includes four rotary members 1, 2, 3, and 4. The first rotary member 1 is connected to the common carrier PC and also to the third shaft SFT3. The second rotary member 2 is connected to the first sun gear S1. The second rotary member 2 is connected through a second clutch C2 to the first shaft section of the second shaft SFT2 and also through a first brake B1 to the transmission casing. The third rotary member 3 is connected to the first ring gear R1. The fourth rotary member 4 is connected to the second ring gear R2 and also to the second shaft section of the second shaft SFT2. A first clutch C1 is provided between the first and second shaft sections of the second shaft SFT2.

Rotation of the third rotary member 3 is transmitted through a second transfer gear train TG2 to an equivalent rotary member 3' provided for rotation about the first shaft SFT1. The equivalent rotation member 3' is connected through a third clutch C3 to the first shaft SFT1 and also through a second brake B2 or a one-way clutch OWC to the transmission casing. The one-way clutch OWC is operated mechanically. An automatic transmission control unit is employed to engage or disengage the hydraulic friction elements C1, C2, C3, B1 and B2 for selecting one of the torque delivery paths in response to a selected gear position.

FIG. 6 is a table showing the engaged and disengaged states of the hydraulic clutches and brakes for selected gear positions including a park position P, a reverse position R, a neutral position N and drive positions D1 to D4. As can be seen from FIG. 6, the automatic transmission produces four forward speed ratios and a reverse speed ratio.

Figure 7:
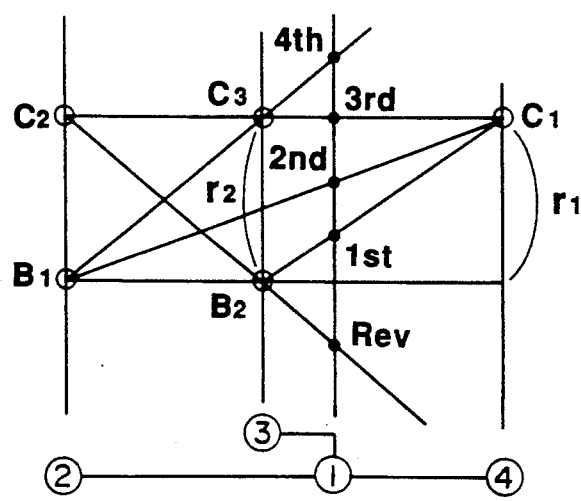
FIG. 7 is a diagram used in explaining the operation of the automatic transmission of FIG. 5.

The operation is as follows. The automatic transmission control unit engages two of the friction elements C1, C2, C3, B1 and B2 to provide a speed ratio in the automatic transmission, as shown in FIG. 7. In FIG. 7, the abscissae represent the rotary member position assigned according to the selected gear tooth number ratio and the ordinates represent the rotation speed ratio. The friction elements are placed at respective points of intersection of the vertical and horizontal lines. The vertical lines extend through the respective rotary members. The horizontal lines include a line extending through a point at which the rotation speed ratio is zero and a line extending through a point at which the rotation speed ratio is 1. A point of intersection of the line extending through the two engaged friction elements and the line extending through the first rotary element (output member) 1 indicates a gear ratio; that is, the ratio of the rotation speed of the output member to the rotation speed of the input member.

Figures 8, 9:
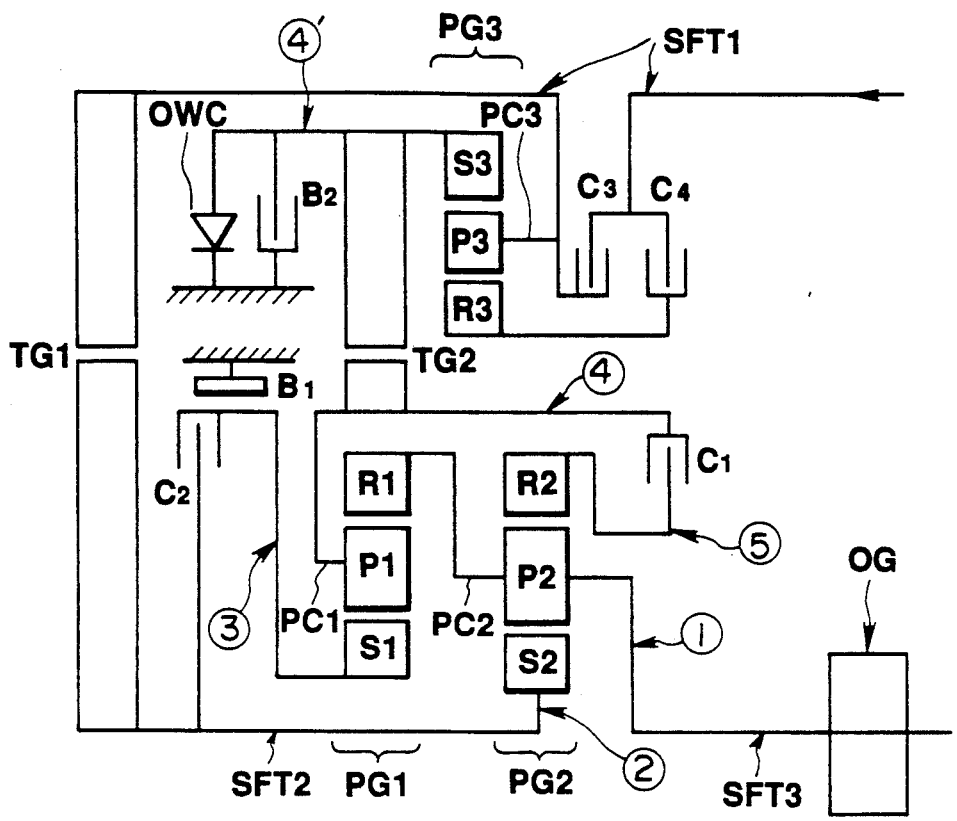
FIG. 8 is a schematic diagram showing a third embodiment of the automatic transmission of the invention.
FIG. 9 is a table showing the engaged and disengaged states of friction clutches and brakes illustrated in FIG. 8 to effect various speed ratio changes.

Referring to FIG. 8, there is shown a third embodiment of the automatic transmission of the invention. The automatic transmission includes first, second and third shafts SFT1, SFT2 and SFT3 arranged in a transmission casing. The first shaft (input member) SFT1 is concentrical with an engine output shaft and is connected to the engine output shaft. The second shaft SFT2 is not concentrical and parallel with the first shaft SFT1. The third shaft (output member) SFT3 is concentrical with the second shaft SFT2. The third shaft SFT3 has an output gear OG for connection to a differential (not shown). A first transfer gear train TG1 is provided for transmitting rotation from the first shaft SFT1 to the second shaft SFT2. The second shaft SFT2 has a main transmission unit provided thereon. The main transmission unit includes a gear train comprised of first and second simple planetary gear units PG1 and PG2. The first planetary gear unit PG1 includes a first ring gear R1, a first sun gear S1, a first pinion P1 and a first pinion carrier PC1. The second planetary gear unit PG2 includes a second ring gear R2, a second sun gear S2, a second pinion P2, and a second pinion carrier PC2. The second pinion carrier PC2 connects the first ring gear R1 and the second pinion P2.

The automatic transmission also includes five rotary members 1, 2, 3, 4 and 5. The first rotary member 1 is connected to the first ring gear R1 and the second pinion P2. The first rotary member 1 is connected to the third shaft SFT3. The second rotary member 2 is connected to the second sun gear S2. The second rotary member 2 is connected to the first shaft SFT1, the first transfer gear train TG1 and the second shaft SFT2. The third rotary member 3 is connected to the first sun gear S1. The third rotary member 3 is connected through a second clutch C2 to the first shaft SFT1, the first transfer gear train TG1 and the second shaft SFT2 and also through a first brake B1 to the transmission casing. The fourth rotary member 4 is connected to the first pinion carrier PC1. The fifth rotary member 5 is connected to the second ring gear R2. The fourth and fifth rotary members 4 and 5 are connected through a first clutch C1.

Rotation of the fourth rotary member 4 is transmitted through a second transfer gear train TG2 to an equivalent rotary member 4' provided for rotation about the first shaft SFT1. The equivalent rotary member 4' is connected to the transmission casing through a second brake B2 or a one-way clutch OWC.

In this embodiment, the first shaft SFT1 has a third simple planetary gear unit PG3 provided thereon for providing a plurality of torque delivery paths between the first shaft SFT1 and the equivalent rotary member 4'. The first shaft SFT1 is divided into first and second shaft sections concentrical with the engine output shaft. The first shaft section is connected to the engine output shaft. The second shaft section is connected through the first transfer gear train TG1 to the second shaft SFT2. The third planetary gear unit PG3 includes a third sun gear S3, a third ring gear R3, a third pinion P3 and a third pinion carrier PC3 carrying the third pinion P3. The third sun gear S3 is connected to the equivalent rotary member 4'. The third ring gear R3 is connected through a fourth clutch C4 to the first shaft section of the first shaft SFT1. The third pinion carrier PC3 is connected to the second shaft section of the first shaft SFT1 and also through a third clutch C3 to the first shaft section of the first shaft SFT1. The one-way clutch OWC is operated mechanically. An automatic transmission control unit is employed to engage or disengage the hydraulic friction elements including the clutches C1, C2 and C3 and brakes B1 and B2 for selecting one of the torque delivery paths in response to a selected gear position.

FIG. 9 is a table showing the engaged and disengaged states of the hydraulic clutches and brakes for selected gear positions including a park position P, a reverse position R, a neutral position N and drive positions D1 to D5. As can be seen from FIG. 9, the automatic transmission produces five forward speed ratios and a reverse speed ratio.

Figures 10, 11:
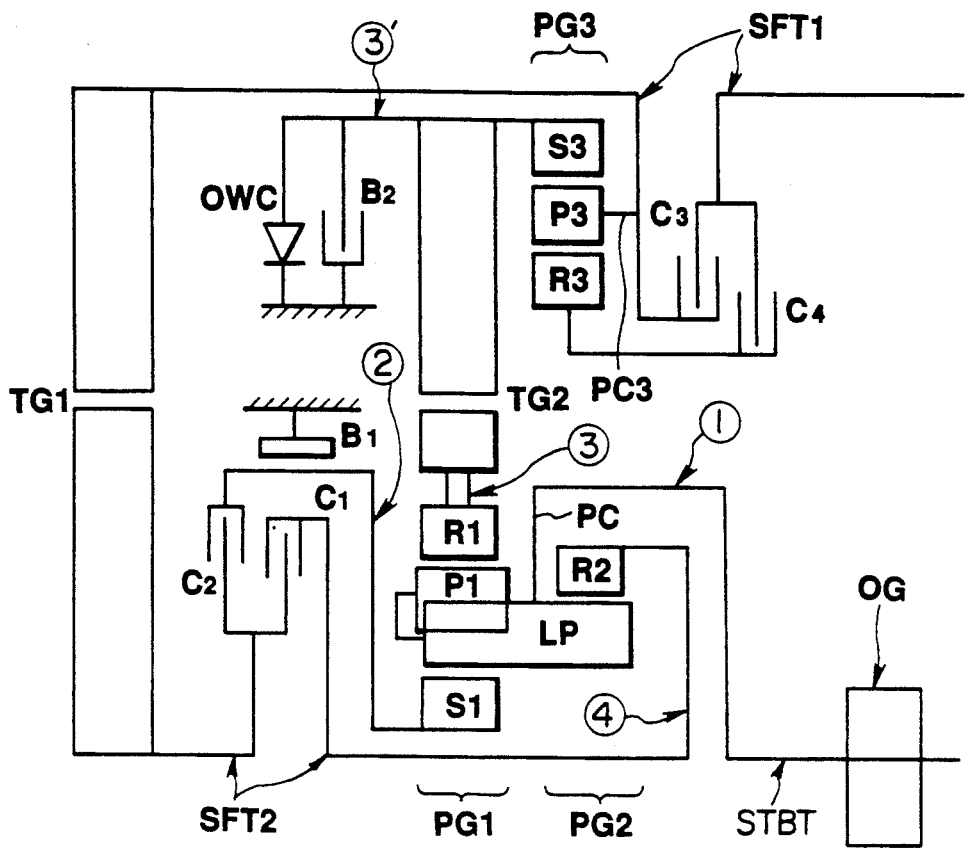
FIG. 10 is a schematic diagram showing a fourth embodiment of the automatic transmission of the invention.
FIG. 11 is a table showing the engaged and disengaged states of friction clutches and brakes illustrated in FIG. 10 to effect various speed ratio changes.

Referring to FIG. 10, there is shown a fourth embodiment of the automatic transmission of the invention.

The automatic transmission includes first, second and third shafts SFT1, SFT2 and SFT3 arranged in a transmission casing. The first shaft (input member) SFT1 is concentrical with an engine output shaft and is connected to the engine output shaft. The second shaft SFT2 is not concentrical and parallel with the first shaft SFT1. The third shaft (output member) SFT3 is concentrical with the second shaft SFT2. The third shaft SFT3 has an output gear OG for connection to a differential (not shown). A first transfer gear train TG1 is provided for transmitting rotation from the first shaft SFT1 to the second shaft SFT2. The second shaft SFT2 has a main transmission unit provided thereon. The main transmission unit includes a gear train comprised of first and second planetary gear units PG1 and PG2 and a common carrier PC. The first planetary gear unit PG1 includes a first ring gear R1, a first sun gear S1 and a first pinion P1. The second planetary gear unit PG2 includes a second ring gear R2 and a long pinion LP held in mesh engagement with the second ring gear R2, the first sun gear S1 and the first pinion P1. The common carrier PC carries the first pinion P1 and the long pinion PL.

The automatic transmission also includes four rotary members 1, 2, 3, and 4. The first rotary member 1 is connected to the common carrier PC. The first rotary member 1 is connected to the third shaft SFT3. The second rotary member 2 is connected to the first sun gear S1. The second rotary member 2 is connected through a second clutch C2 to the first shaft SFT1, the first transfer gear train TG1 and the second shaft SFT2 and also through a first brake B1 to the transmission casing. The third rotary member 3 is connected to the first ring gear R1. The fourth rotary member 4 is connected to the second ring gear R2. The fourth rotary member 4 is connected through a first clutch C1 to the first shaft SFT1, the first transfer gear train TG1 and the second shaft SFT2.

Rotation of the third rotary member 3 is transmitted through a second transfer gear train TG2 to an equivalent rotary member 3' provided for rotation about the first shaft SFT1. The equivalent rotation member 3' is connected through a second brake B2 or a one-way clutch OWC to the transmission casing.

The first shaft has a third simple planetary gear unit PG3 provided thereon for providing a plurality of torque delivery paths between the first shaft SFT1 and the equivalent rotary member 3'. The first shaft SFT1 is divided into first and second shaft sections concentrical with the engine output shaft. The first shaft section is connected to the engine output shaft. The second shaft section is connected through the first transfer gear train TG1 to the second shaft SFT2. The third planetary gear unit PG3 includes a third sun gear S3, a third ring gear R3, a third pinion P3 and a third pinion carrier PC3. The third sun gear S3 is connected to the equivalent rotary member 3'. The third ring gear R3 is connected through a fourth clutch C4 to the first shaft section of the first shaft SFT1. The third pinion carrier PC3, which carries the third pinion P3, is connected to the second shaft section of the first shaft SFT1 and also through a third clutch C3 to the first shaft section of the first shaft SFT1.

The one-way clutch OWC is operated mechanically. An automatic transmission control unit is employed to engage or disengage the hydraulic friction elements including the clutches C1, C2 and C3 and brakes B1 and B2 for selecting one of the torque delivery paths according to a selected gear position.

FIG. 11 is a table showing the engaged and disengaged states of the hydraulic clutches and brakes for selected gear positions including a park position P, a reverse position R, a neutral position N and drive positions D1 to D5. As can be seen from FIG. 11, the automatic transmission produces five forward speed ratios and a reverse speed ratio.

Figure 12:
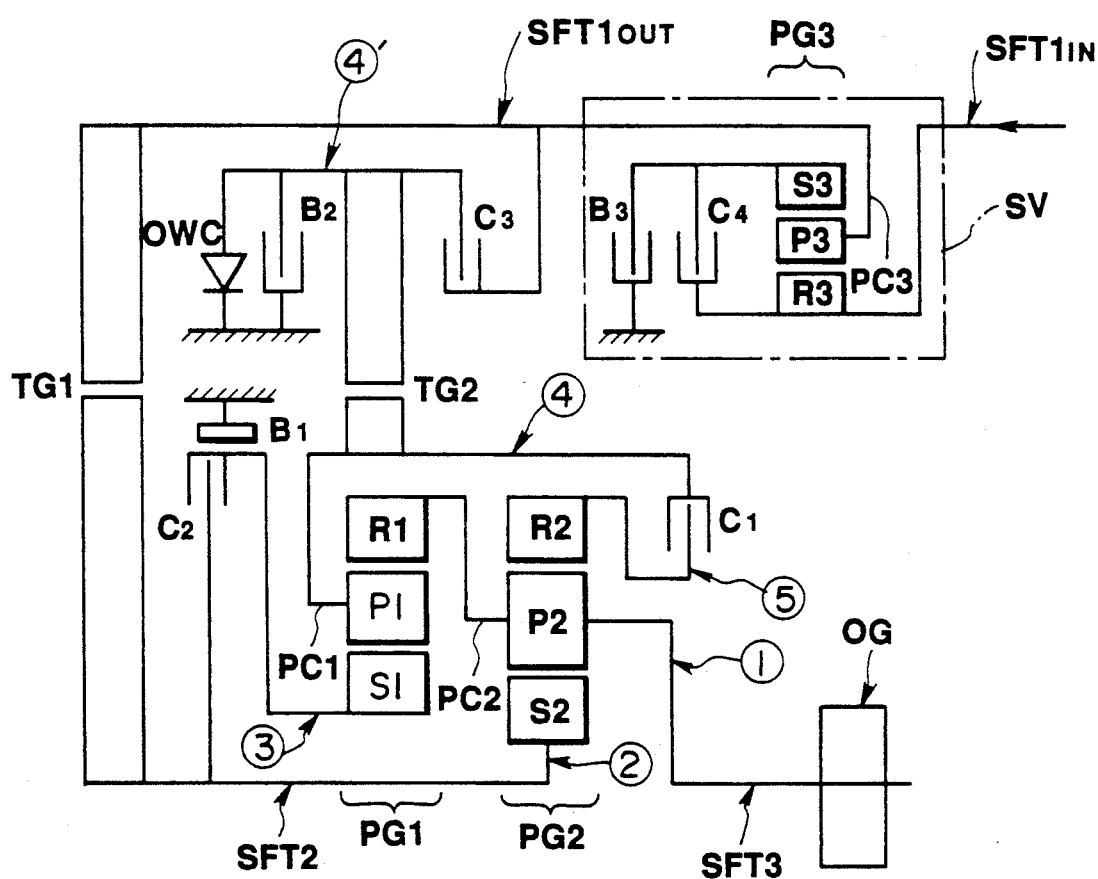
FIG. 12 is a schematic diagram showing a fifth embodiment of the automatic transmission of the invention.

Referring to FIG. 12, there is shown a fifth embodiment of the automatic transmission of the invention. The automatic transmission includes first, second and third shafts SFT1, SFT2 and SFT3 arranged in a transmission casing. The first shaft (input member) SFT1 is concentrical with an engine output shaft and is connected to the engine output shaft. The second shaft SFT2 is not concentrical and parallel with the first shaft SFT1. The third shaft (output member) SFT3 is concentrical with the second shaft SFT2. The third shafts SFT3 has an output gear OG for connection to a differential (not shown). A first transfer gear train TG1 is provided for transmitting rotation from the first shaft SFT1 to the second shaft SFT2. In this embodiment, the first shaft SFT1 is divided into an input section SFT1IN and an output section SFT1OUT.

The second shaft SFT2 has a main transmission unit provided thereon. The main transmission unit includes a gear train comprised of first and second simple planetary gear units PG1 and PG2 for providing a plurality of torque delivery paths between the second and third shafts SFT2 and SFT3. The first planetary gear unit PG1 includes a first ring gear R1, a first sun gear S1, a first pinion P1 and a first pinion carrier PC1. The second planetary gear unit PG2 includes a second ring gear R2, a second sun gear S2, a second pinion P2, and a second pinion carrier PC2. The second pinion carrier PC2, which carries the second pinion P2, is connected to the first ring gear R1.

The automatic transmission also includes five rotary members 1, 2, 3, 4 and 5. The first rotary member 1 is connected to the second pinion P2 and also to the third shaft SFT3. The second rotary member 2 is connected to the second sun gear S2 and also to the second shaft SFT2. The third rotary member 3 is connected to the first sun gear S1. The third rotary member 3 is connected through a second clutch C2 to the second shaft SFT2 and also through a first brake B1 to the transmission casing. The fourth rotary member 4 is connected to the first pinion carrier PC1. The fifth rotary member 5 is connected to the second ring gear R2 and also through a first clutch C1 to the fourth rotary member 4.

Rotation of the fourth rotary member 4 is transmitted through a second transfer gear train TG2 to an equivalent rotary member 4' provided for rotation about the first shaft SFT1. The equivalent rotation member 4' is connected through a second brake B2 or a one-way clutch OWC to the transmission casing and also through a third clutch C3 to the first shaft SFT1.

The first shaft SFT1 is divided into first and second shaft sections SFT1IN and SFT1OUT concentrical with the engine output shaft. The first shaft section SFT1IN is connected to the engine output shaft. The second shaft section SFT1OUT is connected through the first transfer gear train TG1 to the second shaft SFT2. The first shaft SFT1 has an auxiliary transmission unit SV for providing a plurality of torque delivery paths between the first and second shaft sections SFT1IN and SFT1OUT. The auxiliary transmission unit SV includes a simple planetary gear unit PG3, a fourth clutch C4 and a third brake B3. The planetary gear unit PG3 includes a third ring gear R3, a third sun gear S3, a third pinion P3 and a third pinion carrier PC3 carrying the third pinion P3. The third ring gear R3 is connected to the first shaft section SFT1In of the input shaft SFT1. The third ring gear R3 is connected through the fourth clutch C4 to the third sun gear S3. The third sun gear S3 is connected through the third brake B3 to the transmission casing. The third pinion carrier PC3 is connected to the second shaft section SFT1OUT of the first shaft SFT1.

Since the main transmission unit can produce four speed ratios and the auxiliary transmission unit SV can produce two speed ratios, the automatic transmission can produce eight (2×4) speed ratios.

The automatic transmission of the invention have advantageous effects as follows: First, the main transmission is provided on the second shaft SFT2 and some of the friction elements used for the main transmission are placed on the first shaft SFT1 arranged in parallel with the second shaft SFT2. This is effective to increase the degree of freedom in designing automatic transmissions. Second, the second transfer gear train TG2 is provided for transmitting rotation of one of the rotary members to an equivalent rotary member provided for rotation about the first shaft SFT1. The equivalent rotary member is equivalent to the one rotary member. The third clutch C3 and the second brake B2 are placed between the first shaft SFT1 and the equivalent rotary member. This is effective to shorten the required shaft length, resulting in a compact automatic transmission. Third, the automatic transmission of the invention requires a reduced number of friction elements for producing multi-speed ratios. Although it is possible to produce four forward speed ratios by combining a main transmission adapted to produce three speed ratios and an auxiliary transmission adapted to produce two speed ratios, such an automatic transmission requires at least six friction elements. The automatic transmission of the invention requires five friction elements to produce four forward speed ratios. Fourth, some gear ratios can be changed by changing the ratio of the gear ratios of the first and second transfer gear trains TG1 and TG2 without any modification in the planetary gear units PG1 and PG2. This is effective to produce gear ratios which cannot be obtained by the planetary gear units.

Although this invention has been described in conjunction with specific embodiments thereof, it is evident that many alternatives, modifications and variations will be apparent to those skilled in the art. For example, the gear train of the main transmission unit is not limited in any way to the illustrated ones. Accordingly, it is intended to embrace all alternatives, modifications and variations that fall within the broad scope of the appended claims.

What is claimed is:

1. An automatic transmission for use with an automotive vehicle having an engine provided with an output shaft, and a differential, the automatic transmission, comprising:
    a casing;
    first, second and third shafts arranged in the casing, the first shaft being concentrical with the engine output shaft, the second shaft being parallel with the first shaft, the third shaft being concentrical with the second shaft, the third shaft being connected to the differential;
    a first transfer gear train for transmitting rotation from the first shaft to the second shaft;
    a main transmission unit including planetary gearing having rotary members for providing a plurality of torque delivery paths between the second and third shafts, and friction elements associated with the planetary gearing for selecting one of the torque delivery paths in response to a selected gear position, the planetary gearing being provided on the second shaft;
    an equivalent rotary member provided on the first shaft, the equivalent rotary member being equivalent to one of the rotary members;
    the friction elements including a first friction element through which the equivalent rotary member is connected to the first shaft and a second friction element through which the equivalent rotary member is connected to the casing; and
    a second transfer gear train for transmitting rotation from the one rotary member to the equivalent rotary member;
    the first shaft having a planetary gear unit provided thereon for providing a plurality of torque delivery paths between the first shaft and the equivalent rotary member.

2. An automatic transmission for use with an automotive vehicle having an engine provided with an output shaft, and a differential, the automatic transmission, comprising:
    a casing;
    first, second and third shafts arranged in the casing, the first shaft being concentrical with the engine output shaft, the second shaft being parallel with the first shaft, the third shaft being concentrical with the second shaft, the third shaft being connected to the differential;
    a first transfer gear train for transmitting rotation from the first shaft to the second shaft;
    a main transmission unit including planetary gearing having rotary members for providing a plurality of torque delivery paths between the second and third shafts, and friction elements associated with the planetary gearing for selecting one of the torque delivery paths in response to a selected gear position, the planetary gearing being provided on the second shaft;
    an equivalent rotary member provided on the first shaft, the equivalent rotary member being equivalent to one of the rotary members;
    the friction elements including a first friction element through which the equivalent rotary member is connected to the first shaft and a second friction element through which the equivalent rotary member is connected to the casing; and
    a second transfer gear train for transmitting rotation from the one rotary member to the equivalent rotary member;
    the first shaft being divided into first and second shaft sections concentrical with the engine output shaft, the first shaft section being connected to the engine output shaft, the second shaft section being connected through the first transfer gear train to the second shaft, the first shaft having an auxiliary transmission unit for providing a plurality of torque delivery paths between the first and second shaft sections.

3. An automatic transmission for use with an automotive vehicle having an engine provided with an output shaft, and a differential, the automatic transmission, comprising:

a casing;

first, second and third shafts arranged in the casing, the first shaft being concentrical with the engine output shaft, the second shaft being parallel with the first shaft, the third shaft being connected to the differential;

a first transfer gear train for transmitting rotation from the first shaft to the second shaft;

a main transmission unit including planetary gearing having rotary members for providing a plurality of torque delivery paths between the second and third shafts, and friction elements associated with the planetary gearing for selecting one of the torque delivery paths in response to a selected gear position, the planetary gearing being provided on the second shaft;

an equivalent rotary member provided on the first shaft, the equivalent rotary member being equivalent to one of the rotary members;

the friction elements including a first friction element through which the equivalent rotary member is connected to the first shaft and a second friction element through which the equivalent rotary member is connected to the casing; and a second transfer gear train for transmitting rotation from the one rotary member to the equivalent rotary member;

the planetary gearing comprising first and second planetary gear units, the first planetary gear unit including a first ring gear, a first sun gear, a first pinion and a first pinion carrier carrying the first pinion, the second planetary gear unit including a second ring gear, a second sun gear, a second pinion and a second pinion carrier carrying the second pinion, the second pinion carrier being connected to the first ring gear;

the rotary members including a first rotary member connected to the second pinion and to the third shaft, a second rotary member connected to the second sun gear and to the second shaft, a third rotary member connected to the first shaft, a third rotary member connected to the first shaft, a third rotary member connected to the first sun gear, a fourth rotary member connected to the first pinion, and a fifth rotary member connected to the second ring gear;

the friction elements including a first clutch connected between the fourth and fifth rotary members, a second clutch connected between the first sun gear and the second shaft, a third clutch connected between the equivalent rotary member and the first shaft, a first brake connected between the third rotary member and the casing, and a second brake connected between the equivalent rotary member and the casing;

the one rotary member being the third clutch; and the second friction element being the second brake.

4. The automatic transmission as claimed in claim 3, wherein the first shaft has a third planetary gear unit provided thereon for providing a plurality of torque delivery paths between the first shaft and the equivalent rotary member.

5. The automatic transmission as claimed in claim 3, wherein the first shaft is divided into first and second shaft sections concentrical with the engine output shaft, the first shaft section being connected to the engine output shaft, the second shaft section being connected through the first transfer gear train to the second shaft, the first shaft having an auxiliary transmission unit for providing a plurality of torque delivery paths between the first and second shaft sections.

6. The automatic transmission as claimed in claim 5, wherein the auxiliary transmission unit comprises a third planetary gear unit, a fourth clutch and a third brake, the third planetary gear unit including a third ring gear, a third sun gear, a third pinion and a third pinion carrier carrying the third pinion, the third ring gear being connected to the first shaft section and also through the fourth clutch to the sun gear, the third sun gear being connected through the third brake to the casing, the third pinion carrier being connected to the second shaft section.

7. An automatic transmission for use with an automotive vehicle having an engine provided with an output shaft, and a differential, the automatic transmission, comprising:

a casing;

first, second and third shafts arranged in the casing, the first shaft being concentrical with the engine output shaft, the second shaft being parallel with the first shaft, the third shaft being connected to the differential;

a first transfer gear train for transmitting rotation from the first shaft to the second shaft;

a main transmission unit including planetary gearing having rotary member for providing a plurality of torque delivery paths between the second and third shafts, and a friction elements associated with the planetary gearing for selecting one of the torque delivery paths in response to a selected gear position, the planetary gearing being provided on the second shaft, the planetary gearing including first and second planetary gear units, the first planetary gear unit including a first ring gear, a first sun gear, a first pinion and a first pinion carrier carrying the first pinion, the second planetary gear unit including a second ring gear, a second sun gear, a second pinion and a second pinion carrier carrying the second pinion, the second pinion carrier being connected to the first ring gear;

a third planetary gear unit provided on the first shaft for providing a plurality of torque delivery paths between the first shaft and the equivalent rotary member;

the first shaft being divided into first and second shaft sections concentrical with the engine output shaft, the first shaft section being connected to the engine output shaft, the second shaft section being connected through the first transfer gear train to the second shaft;

the rotary members including a first rotary member connected to the second pinion and to the third shaft, a second rotary member connected to the second sun gear and to the second shaft, a third rotary member connected to the first sun gear, a fourth rotary member connected to the first pinion, and a fifth rotary member connected to the second ring gear;

an equivalent rotary member provided on the first shaft, the equivalent rotary member being equivalent to the fourth rotary member;

a second transfer gear train for transmitting rotation from the fourth rotary member to the equivalent rotary member;

the friction elements including a first clutch connected between the fourth and fifth rotary members, a second clutch connected between the first sun gear and the second shaft, a first brake connected between the third rotary member and the casing, and a second brake connected between the equivalent rotary member and the casing;

the third planetary gear unit including a third ring gear connected through a fourth clutch to the first shaft section, a third sun gear connected to the equivalent rotary member, a third pinion and a third pinion carrier carrying the third pinion, the third pinion carrier being connected to the second shaft section and also through a third clutch to the first shaft section.

8. An automatic transmission for use with an automotive vehicle having an engine provided with an output shaft, and a differential, the automatic transmission, comprising:

a casing;

first, second and third shafts arranged in the casing, the first shaft being concentrical with the engine output shaft, the second shaft being parallel with the first shaft, the third shaft being connected to the differential;

a first transfer gear train for transmitting rotation from the first shaft to the second shaft;

a main transmission unit including planetary gearing having rotary members for providing a plurality of torque delivery paths between the second and third shafts, and friction elements associated with the planetary gearing for selecting one of the torque delivery paths in response to a selected gear position, the planetary gearing being provided on the second shaft;

an equivalent rotary member provided on the first shaft, the equivalent rotary member being equivalent to one of the rotary members;

the friction elements including a first friction element through which the equivalent rotary member is connected to the first shaft and a second friction element through which the equivalent rotary member is connected to the casing; and a second transfer gear train for transmitting rotation from the one rotary member to the equivalent rotary member;

the second shaft being divided into first and second shaft sections concentrical with the third shaft, the first shaft section being connected through the first transfer gear rain to the first shaft;

the planetary gearing comprising first and second planetary gear units provided on the second shaft, the first planetary gear unit including a first ring gear, a first sun gear, and a first pinion, the second planetary gear unit including a second ring gear and a long pinion held in mesh engagement with the first sun gear and the first pinion, and a common carrier carrying the first pinion and the long pinion;

the rotary members including a first rotary member connected to the common carrier and to the third shaft, a second rotary member connected to the first sun gear, a third rotary member connected to the first ring gear, and a fourth rotary member connected to the second ring gear and also to the second shaft section;

the friction elements including a first clutch connected between the first and second shaft sections, a second clutch connected between the first shaft section and the second rotary member, a third clutch connected between the first shaft and the equivalent rotary member, a first brake connected between the second rotary member and the casing, and a second brake connected between the equivalent rotary member and the casing;

the one rotary member being the third rotary member, the first friction element being the third clutch, and the second friction element being the second brake.

9. The automatic transmission as claimed in claim 8, wherein the first shaft has a third planetary gear unit provided thereon for providing a plurality of torque delivery paths between the first shaft and the equivalent rotary member.

10. The automatic transmission as claimed in claim 9, wherein the first shaft is divided into first and second shaft sections concentrical with the engine output shaft, the first shaft section of the first shaft being connected to the engine output shaft, the second shaft section of the first shaft being connected through the first transfer gear train to the first shaft section of the second shaft, wherein the third planetary gear unit includes a third ring gear connected through a fourth clutch to the first shaft section of the first shaft, a third sun gear connected to the equivalent rotary member, a third pinion and a third pinion carrier carrying the third pinion, the third pinion carrier being connected to the second shaft section of the first shaft and also through a third clutch to the first shaft section of the first shaft.

* * * * *